United States Patent
Matsui et al.

(10) Patent No.: US 8,884,894 B2
(45) Date of Patent: Nov. 11, 2014

(54) INPUT DETECTION DEVICE, INPUT DETECTION METHOD, INPUT DETECTION PROGRAM, AND COMPUTER READABLE MEDIA

(75) Inventors: Yoshikazu Matsui, Hyogo (JP); Naoki Sumi, Hyogo (JP); Kazuyuki Hashimoto, Hyogo (JP)

(73) Assignee: Innolux Corporation, Chu-Nan (TW)

( * ) Notice: Subject to any disclaimer, the term of this patent is extended or adjusted under 35 U.S.C. 154(b) by 73 days.

(21) Appl. No.: 13/241,061

(22) Filed: Sep. 22, 2011

(65) Prior Publication Data
US 2012/0075220 A1 Mar. 29, 2012

Related U.S. Application Data

(60) Provisional application No. 61/385,687, filed on Sep. 23, 2010.

(30) Foreign Application Priority Data

Feb. 15, 2011 (JP) .................................. 2011-030153

(51) Int. Cl.
G06F 3/041 (2006.01)
G06F 3/044 (2006.01)

(52) U.S. Cl.
CPC .............. G06F 3/044 (2013.01); G06F 3/0416 (2013.01)
USPC .......................... 345/173; 345/174; 178/18.06

(58) Field of Classification Search
USPC ...................... 345/173–184; 178/18.03–18.07
See application file for complete search history.

(56) References Cited

U.S. PATENT DOCUMENTS

| | | | |
|---|---|---|---|
| 2009/0044124 A1* | 2/2009 | Pihlaja ........................... | 715/733 |
| 2010/0053097 A1* | 3/2010 | Goh et al. ...................... | 345/173 |
| 2010/0073301 A1* | 3/2010 | Yousefpor et al. ............. | 345/173 |
| 2010/0097355 A1* | 4/2010 | Jang et al. ...................... | 345/178 |

(Continued)

FOREIGN PATENT DOCUMENTS

| | | |
|---|---|---|
| TW | 201005616 | 2/2010 |
| TW | 201017495 | 5/2010 |

(Continued)

OTHER PUBLICATIONS

WO 2010/029952 Machine Translation from WIPO website.*
U.S. Appl. No. 61/326,830.*

*Primary Examiner* — Lun-Yi Lao
*Assistant Examiner* — Ibrahim Khan
(74) *Attorney, Agent, or Firm* — Liu & Liu

(57) ABSTRACT

An input detection device including: a reading part reading touch inputs from an input interface of a touch sensor by scanning every above two electrode lines which are adjacent on the scanning sequence from an end of the input interface to the opposite end, and acquiring a difference between detection data obtained from a half of the above two electrode lines which are successive and from the other half of the above two electrode lines which are successive; and a calculation part integrating the differences for the entire input interface to obtain touch information, wherein if an integration result obtained in the case where the above two lines stretches over the scanning finish end and the scanning start end is not satisfied with a predetermined value, the calculation part resets the detection data obtained from the electrode line located at the scanning finish end to be the predetermined value.

12 Claims, 16 Drawing Sheets

(56) References Cited

U.S. PATENT DOCUMENTS

2010/0188345 A1 7/2010 Keskin et al.
2011/0127092 A1* 6/2011 Lu .............................. 178/18.06
2011/0261007 A1* 10/2011 Joharapurkar et al. ....... 345/174

FOREIGN PATENT DOCUMENTS

| TW | 201019198 | 5/2010 |
| WO | 2010/029952 | 3/2010 |
| WO | WO 2010/029952 A1 * | 3/2010 |

* cited by examiner

INPUT DETECTION DEVICE, INPUT DETECTION METHOD, INPUT DETECTION PROGRAM, AND COMPUTER READABLE MEDIA

CROSS REFERENCE TO RELATED APPLICATIONS

This application claims the benefit of U.S. Provisional Application No. 61/385,687 filed on Sep. 23, 2010, the entirety of which is incorporated by reference herein.

This Application claims priority of Japanese Patent Application No. 2011-030153, filed on Feb. 15, 2011, the entirety of which is incorporated by reference herein.

BACKGROUND OF THE INVENTION

1. Field of the Invention

The present invention relates to an input detection device, an input detection method, and a computer readable media, and in particular relates to an input detection method, and a computer readable media, for detecting touch inputs from an interface of a touch sensor provided with electrodes arranged in a matrix.

2. Description of the Related Art

A differential detection method where two detection electrodes are utilized is well-known for the touch sensor field. The differential detection method is an algorithm, where a touch input is detected from an interface of a touch sensor by acquiring a difference of two detection data. Here, when a plurality of detection electrodes extending in a horizontal or vertical direction in the touch sensor are scanned in sequence, one detection data is obtained from a detection electrode, and the other one is obtained from a reference electrode disposed individually with the detection electrodes or an electrode chosen from the detection electrodes (for example, Patent document 1, Japanese Patent Application Publication no. H05-6153, and Patent document 2, U.S. Patent Application Publication no. 2010/0060610A1). According to the algorithm, influence from surrounding noise (for example, LCD driving noise) may be reduced while input detection.

The differential detection method can also be applied to a touch sensor capable of multi-touch input detection. In U.S. Patent Application Publication no. 2009/0273579A1 (Patent document 3), a method, detecting inputs by scanning every two electrodes which are not adjacent but extended in parallel and then acquiring the difference between data detected from the two electrodes, is disclosed.

Patent document 1: Japanese Patent Application Publication no. H05-6153

Patent document 2, U.S. Patent Application Publication no. 2010/0060610A1

Patent document 3, U.S. Patent Application Publication no. 2009/0273579A1

However, when the differential detection method is applied to a touch sensor capable of multi-touch input detection, in the case where two electrodes to be acquired with a difference of detection data are applied with one of multi-touch inputs respectively, the difference cannot be acquired from the data detected from the two electrodes correctly. As a result, multi-touch inputs cannot be detected correctly.

In recent years, multi-touch screens have been popularly utilized in devices like smart phones. If multi-touch inputs are not detected correctly, a pinch in action wherein two fingers griping an operable object on the screen are moved toward each other to minify the picture, or a pinch out action wherein two fingers are moved away from each other to magnify the picture may not be identified correctly, causing the device to make a wrong response.

The purpose of the invention is to provide an input detection device, an input detection method, and a computer readable media capable of correctly detecting multi-touch inputs with a differential detection algorithm.

BRIEF SUMMARY OF THE INVENTION

A detailed description is given in the following embodiments with reference to the accompanying drawings.

The invention provides an input detection device for detecting a touch input from an input interface of a touch sensor provided with electrodes arranged in a matrix, comprising: a reading part reading the touch input from the input interface by scanning every above two electrode lines which are adjacent on the scanning sequence from an end of the input interface to an opposite end of the input interface, and acquiring a difference between detection data obtained from a half of the above two electrode lines which are successive and detection data obtained from the other half of the above two electrode lines which are successive.

Therefore, a problem, where in the case where one of multi-touch inputs is located at the reference electrode a correct differential output cannot be obtained from the detection data of the detection target electrode and the reference electrode, is solved.

In an embodiment, the input detection device further comprises: a calculation part integrating the differences for the entire input interface of the touch sensor to obtain touch information, wherein the calculation part comprises a reset part wherein if an integration result obtained in the case where the above two lines stretches over the scanning finish end and the scanning start end is not satisfied with a predetermined value, the reset part resets the integration result or the detection data obtained from the electrode line which is located at the scanning finish end to be the predetermined value.

Therefore, even if one of the multi-touch inputs is located at an end of the input interface of the touch sensor, the differential detection algorithm can still be utilized to detect the multi-touch inputs.

In an embodiment, the input detection device further comprises: an end-touch detection part determining whether the touch information comprises a predetermined data series to detect that there are touch inputs located at the two ends of the input interface of the touch sensor, which are equal to the scanning start end and the scanning finish end; and a correction part adding the minimum value of the data series to every data value of the data series to correct the touch information if the end-touch detection part detects that there are touch inputs located at the two ends of the input interface of the touch sensor.

Therefore, even touch inputs are located at two ends of the input interface of the touch sensor, the multi-touch inputs can be detected correctly.

In an embodiment, in the input detection device, when the number of a half of the above two electrode lines which are successive is above two, the calculation part performs integration for each of line groups, respectively, wherein the line groups are defined by dividing the electrode lines according to the location of the every above two electrode lines, and combines the integration result of each line group to obtain the touch information after the entire input interface of the touch sensor is scanned.

Therefore, irrespective of the number of lines scanned once, correct touch information of an entire input interface of the touch sensor can be obtained.

In an embodiment, in the input detection device, the reading part comprises: a selector selecting the every above two electrode lines which are adjacent on the scanning sequence; and a differential amplifier outputting the difference between the detection data obtained from a half of the above two electrode lines which are successive and the detection data obtained from the other half of the above two electrode lines which are successive.

In an embodiment, in the input detection device, the calculation part comprises: a integrator integrating the difference for the entire input interface of the touch sensor; a first memory storing the integration result which is obtained by the integrator from one scan; and a second memory storing the integration result of the entire input interface of the touch sensor obtained by the integrator as the touch information.

In an embodiment, the input detection device further comprises: a noise filter removing low level noise which is lower than a threshold value from the touch information.

In an embodiment, in the input detection device, the input detection device is installed in a display device and the display device displays an input image corresponding to the input interface of the touch sensor.

The invention also provides an input detection method for detecting a touch input from an input interface of a touch sensor provided with electrodes arranged in a matrix, comprising: a reading step for reading the touch input from the input interface by scanning every above two electrode lines which are adjacent on the scanning sequence from an end of the input interface to an opposite end of the input interface, and acquiring a difference between detection data obtained from a half of the above two electrode lines which are successive and detection data obtained from the other half of the above two electrode lines which are successive.

In an embodiment, the input detection method further comprises: a calculation step for integrating the differences for the entire input interface of the touch sensor to obtain touch information, wherein the calculation step comprises a reset step wherein if an integration result obtained in the case where the above two lines stretches over the scanning finish end and the scanning start end is not satisfied with a predetermined value, the integration result or the detection data obtained from the electrode line which is located at the scanning finish end is reset to be the predetermined value.

The invention also provides a computer readable media for detecting a touch input from an input interface of a touch sensor provided with electrodes arranged in a matrix, wherein the computer readable media stores an input detection program executed by a computer to implement functions of a reading part, wherein the reading part reads the touch input from the input interface by scanning every above two electrode lines which are adjacent on the scanning sequence from an end of the input interface to an opposite end of the input interface, and acquiring a difference between detection data obtained from a half of the above two electrode lines which are successive and detection data obtained from the other half of the above two electrode lines which are successive.

In an embodiment, in the computer readable media, the input detection program is executed by a computer to implement functions of a calculation part and a reset part, wherein the calculation part integrates the differences for the entire input interface of the touch sensor to obtain touch information, and if an integration result obtained in the case where the above two lines stretches over the scanning finish end and the scanning start end is not satisfied with a predetermined value, the reset part resets the integration result or the detection data obtained from the electrode line which is located at the scanning finish end to be the predetermined value.

According to the embodiments of the invention, an input detection device, an input detection method, and a computer readable media are provided, wherein multi-touch inputs can be detected correctly by a differential detection algorithm even though one of the multi-touch inputs is located at an end of the input interface of the touch sensor.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Embodiment 1

Figure 1:
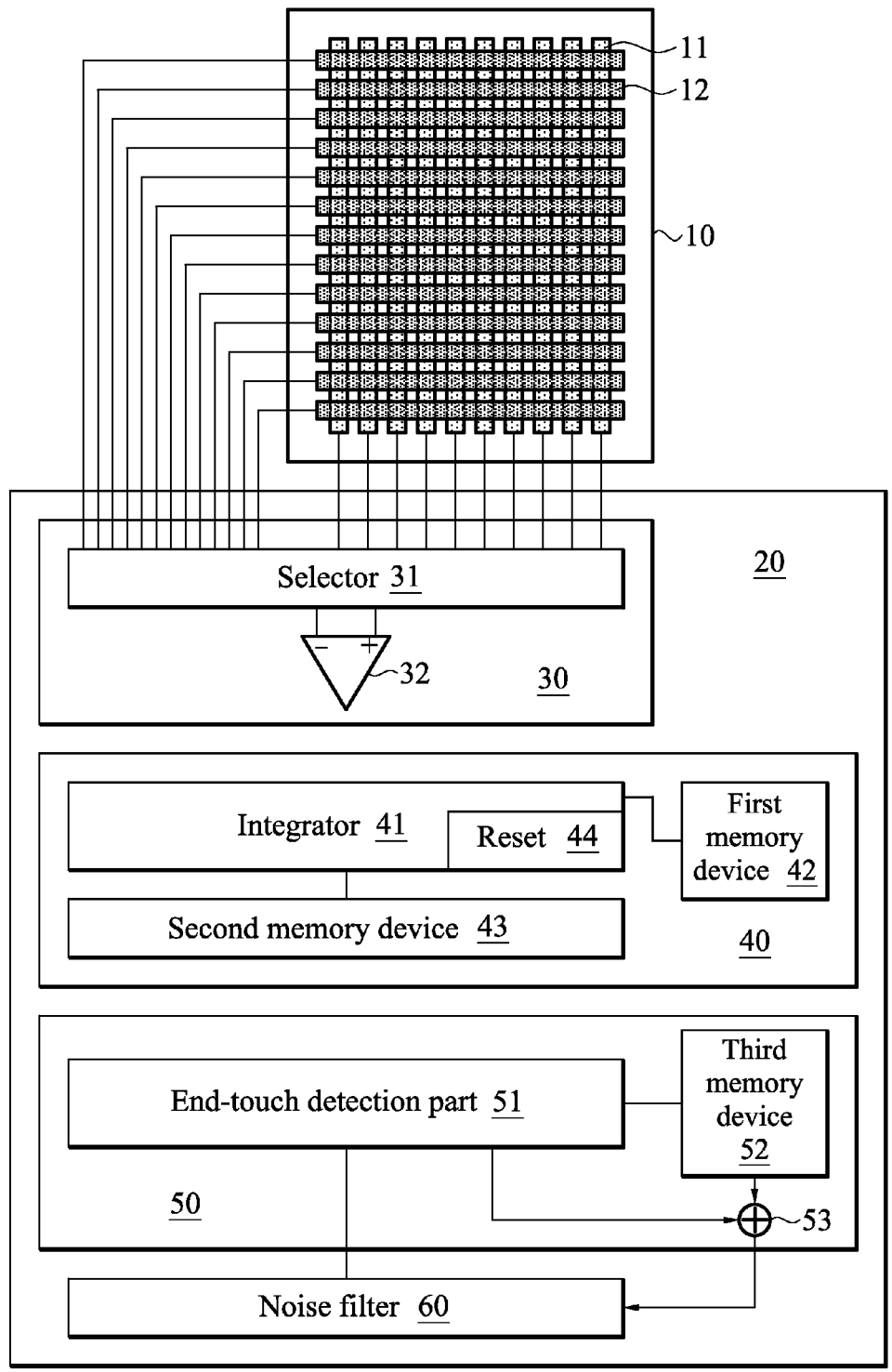
FIG. 1 is a block diagram showing the entire structure of an input detection device according to Embodiment 1 of the invention.

FIG. 1 is a block diagram showing the entire structure of an input detection device according to Embodiment 1 of the invention. In FIG. 1, only elements for implementing necessary functions are showed.

In FIG. 1, the input detection device of Embodiment 1 is provided with a touch sensor 10 and a touch information detection part 20.

The touch sensor 10 has an input interface covered with transparent materials such as glass. The touch sensor 10 is an input detection device which detects touch inputs when the input interface is contacted by a finger or other objects having conductivity. The touch sensor 10 is provided with X electrodes 11 and Y electrodes 12, which are perpendicularly arranged to form a matrix, therein. Various kinds of touch sensors can be adopted as the touch sensor 10 as long as multi-touch inputs can be detected. For example, a projected capacitive touch sensor can be utilized. The projected capacitive touch sensor uses one of an X electrode 11 or Y electrode 12 as a driving electrode and the other as a signal receiving electrode. A driving pulse is supplied from the driving electrode, and the touch sensor 10 detects touch inputs on the input interface by measuring capacitance from a current flowing at the time when a conductor such as a finger touches the input interface.

The X electrodes 11 are used to detect the touch input location in the horizontal direction and arranged along the vertical direction of the input interface in parallel. The Y electrodes 12 are used to detect the touch input location in the vertical direction and arranged along the horizontal direction of the input interface in parallel. In FIG. 1, the X electrodes 11 and the Y electrodes 12 have stripe shapes. However, if line electrodes arranged along the vertical direction and line electrodes arranged along the horizontal direction are crossed and perpendicularly arranged in a matrix form, the X electrodes 11 and the Y electrodes 12 can be constructed by electrodes having various kinds of shapes. For example, an X electrode 11 and a Y electrode 12 may be a line electrode constructed by many small squares connected in serial, wherein a square uses angles to connect to the other squares.

The input surface of the touch sensor 10 is set with predetermined coordinates as detection units. A coordinate can be set at an intersection point of an X electrode 11 and a Y electrode 12. If a detection operation is performed for getting an average of the electrostatic capacitances of a plurality of electrodes, a coordinate can be set at a location deviated from the intersection points of the X electrodes 11 and Y electrodes 12.

Figure 2:
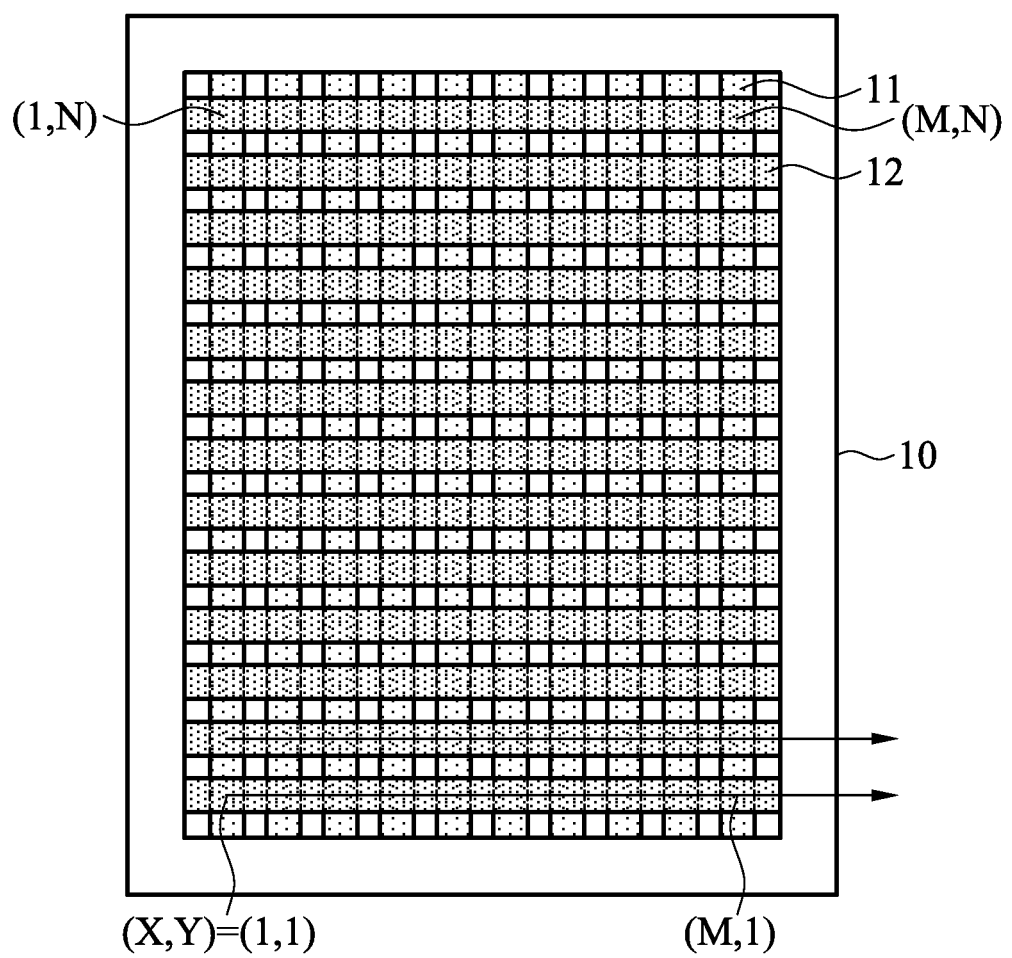
FIG. 2 is diagram showing an example of the electrode structure of the touch sensor in accordance with Embodiment 1.

FIG. 2 is diagram showing an example of the electrode structure of the touch sensor 10 in accordance with Embodiment 1. The touch sensor 10 is provided with the X electrodes 11 which extend in the vertical direction and the Y electrodes 12 which extend in the horizontal direction. The X electrodes 11 and the Y electrodes 12 are arranged perpendicularly to form a matrix. In FIG. 2, there are M lines of X electrodes 11 and N lines of Y electrodes 12. Therefore, an M×N matrix (M columns and N rows) is formed.

Following, a coordinate system is set corresponding to the matrix formed by the X electrodes 11 and the Y electrodes 12. In FIG. 2, the left bottom corner (X, Y) is set at (1, 1), and the right top corner (X, Y) is set at (M, N). Although FIG. 2 is a plane view, the X electrodes 11 and the Y electrodes 12 are disposed to face each other with a gap therebetween. When a conductor such as a finger or a pen is contacted with the interface of the touch sensor 10, the touch location is determined by detecting the variation of the electrostatic capacitance between the X electrodes 11 and the Y electrodes 12 in an electrostatic capacitive touch sensor, or the conductance in a resistive film touch sensor.

In Embodiment 1, an electrostatic capacitive touch sensor is taken as an example. In an electrostatic capacitive touch sensor, coordinates are scanned in the sequence of (1, 1)→(2, 1)→ ... (M, 1)→(1, 2)→ ... (M−1, N)→(M, N) to detect touch information of each coordinate. When scanning of one electrode line is finished, the next electrode line is scanned. Therefore, the touch information of all coordinates of all electrode lines is detected. Namely, the touch information of an entire input interface of the touch sensor is detected. Note that the touch information comprises touch intensity data for showing the existence of a touch, and touch location data for showing the touch location specified by the coordinates.

Back to FIG. 1, the touch information detection part 20 is a means for detecting touch inputs from the input interface of the touch sensor. The touch information detection part 20 is provided with a reading part 30, a calculation part 40, a determination part 50, and a noise filter 60.

The reading part 30 is a means for reading touch inputs from the input interface of the touch sensor 10. As described in FIG. 2, the reading part 30 performs scanning along the Y electrodes 12 and the X electrodes 11 to read out the touch input of each coordinate. Specifically, the reading part 30 performs differential detection on 2 or more than 2 adjacent scan lines arranged along a horizontal or vertical direction and outputs a differential signal. The reading part 30 is provided with a selector 31 and a differential amplifier 32. For example, in the case where scanning is performed from the bottom line to the top line, the selector 31 selects the i-th row Y electrode 12[$i$] as a scanning target and the (i−1)-th row Y electrode 12[$i$−1] as a reference electrode, and connects those electrodes to the input ends of the differential amplifier 32. Then the differential amplifier 32 outputs the difference between the detection data obtained from the Y electrode 12[$i$] and the Y electrode 12[$i$−1] as a differential signal.

In this way, the input detection device of Embodiment 1, when scanning for an entire input interface of the touch sensor 10, doesn't always take the same electrode as a reference electrode, but takes an electrode adjacent to the scanning target electrode as a reference for a line scanning Thus, the problem, where one input of the multi-touch inputs is located on a reference electrode, such that a correct difference cannot be obtained from the reference electrode and a scanning target electrode, is solved.

The calculation part 40 is a means for calculating touch information. The calculation part 40 receives the differential signals from the reading part 30 and integrates the differential signals to calculate the touch information of an entire input interface of the touch sensor 10. The calculation part 40 is provided with an integrator 41, a first memory device 42, and a second memory device 43. The first memory device 42 stores an integral obtained from the integrator 41 for every scanning process. The second memory device 43 stores touch information of an entire input interface of the touch sensor 10, which is obtained by the integration of the integrator 41. The integrator 41 adds the differential signal received from the reading part 30 to an integral stored in the first memory device 42 to obtain a new integral, and then stores the new integral in both the first memory device 42 and the second memory device 43. The first memory device 42 can be rewritten with a new integral calculated by the integrator 41, so that the first memory device 42 can be a line memory capable of storing integrals of at least one line. However, if necessary, the first memory device 42 can also be a memory capable of storing integrals of a plurality of lines. The second memory device 43 is a frame buffer capable of storing integrals of a detection interface of the touch sensor 10 (namely, integrals of a detection interface). If a plurality of sets of touch information are obtained in a frame, the second memory device 43 can be a memory capable of storing more touch information. The calculation part 40 outputs the integrals stored in the frame buffer 43 as touch information of the entire input interface of the touch sensor 10.

The integrator 41 is further provided with a reset part 44. In the case where a scanning target line and a reference line stretches over the scanning finish end and the scanning start end, if the integrals are not satisfied with a predetermined value (for example 0), the reset part 44 resets the integrals. For example, considering the scanning from the bottom line to the top line, the reading part 30 first performs scanning along the first row Y electrode 12[1], and takes the N-th row Y electrode 12[N], which is adjacent to the first row Y electrode 12[1] with respect to scanning sequence, as a reference electrode, and calculates the difference between the detection data of the Y electrodes 12[1] and 12[N]. Meanwhile, if one of the multi-touch inputs is located at the top end of touch sensor 10, even though there is no input located at the bottom end of the touch sensor 10, a difference is still calculated from the detection data of the Y electrodes 12[1] and 12[N]. As a result, wrong touch information showing that there is an input located at the bottom end of the touch sensor 10 is obtained. In this situation, the reset part 44 should be activated. The reset part 44 resets the integrals obtained from the differences of the detection data of the Y electrodes 12[1] and 12[N] to a predetermined value (for example 0). After that, the integrator 41 performs integration for subsequent electrode lines. Thus, the influence from an input located at the top end of the touch sensor 10 to the bottom end of the touch sensor 10 is avoided. In Embodiment 1, the reset part 44 can be embedded in the integrator 41 or disposed outside of the integrator 41.

As a modification, the reset part 44 can only reset the detection data detected from the reference line which is located at the scanning finish end. When the difference of the detection data of the Y electrodes 12[1] and 12[N] is not satisfied with a predetermined value, namely, when the difference is a negative value with respect to a predetermined value "0", the reset part 44 resets the detection data of the N-th row Y electrode 12[N] to 0. Thus, if there is no input located at the bottom end of the touch sensor 10, the detection data of the first row Y electrode 12[1] would be 0 and accordingly the difference of the detection data of the Y electrodes 12[1] and 12[N] would also be zero.

The determination part 50 is a means for determining whether there is any touch input located at two ends of the input interface of the touch sensor 10, which are equal to the scanning start end and the scanning finish end, based on the touch information of an entire input interface of the touch sensor 10 calculated by the calculation part 40, and correcting the touch information according to the determination result. The determination part 50 is provided with an end-touch detection part 51, a third memory device 52, and an adder 53. The end-touch detection part 51 determines whether the touch information of an entire input interface of the touch sensor 10 calculated by the calculation part 40 comprises a predetermined data series, and detects the touch inputs located at two ends of the input interface of the touch sensor 10, which are equal to the scanning start end and the scanning finish end. The third memory device 52 is a single value memory for storing the minimum value of the data series when the touch information of an entire input interface of the touch sensor 10 comprises a predetermined data series, namely, when there is a touch input located at two ends of the input interface of the touch sensor 10. The adder 53 corrects the touch information by adding the value stored in the single value memory 52 to the touch information.

The noise filter 60 is a means for removing low level noise which is lower than a threshold value from the touch information.

Figure 3:
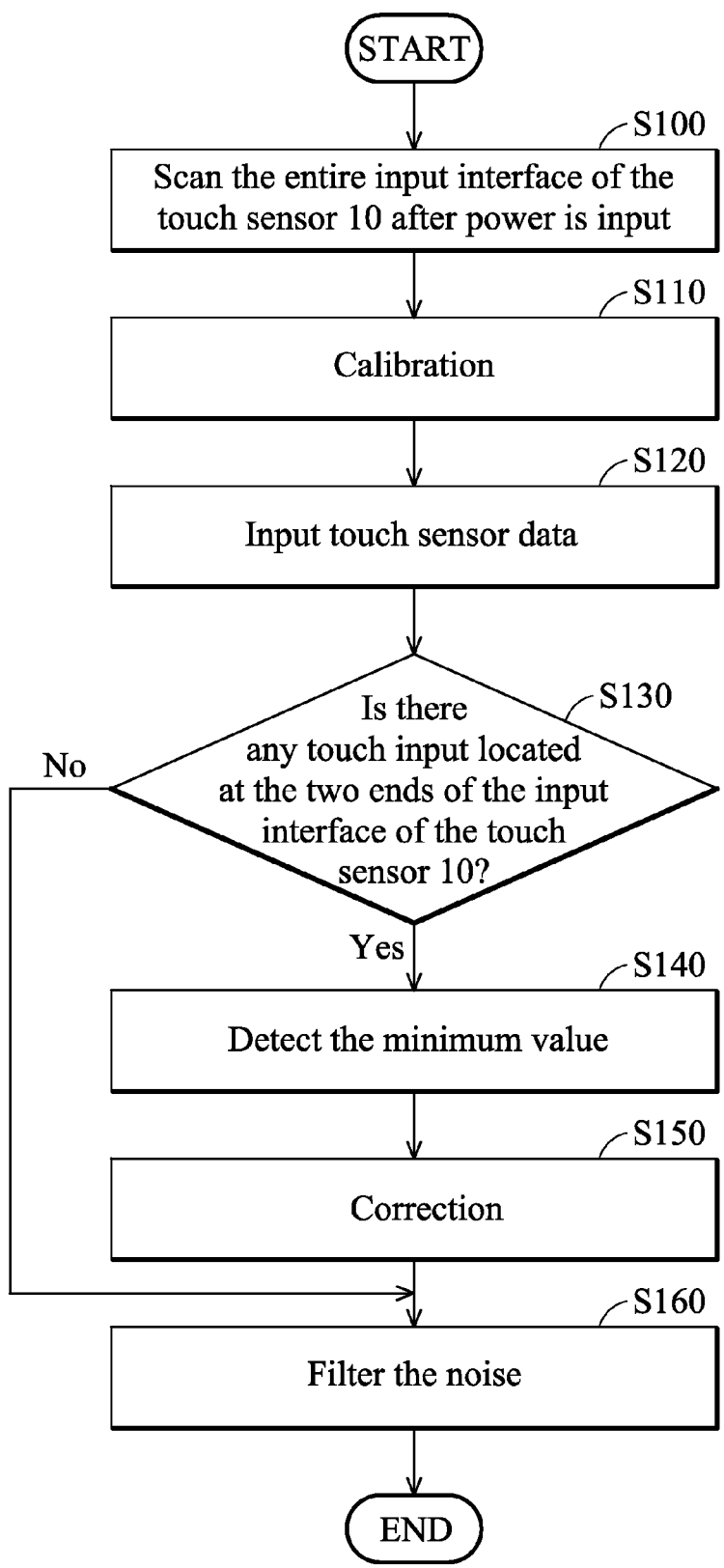
FIG. 3 is a flow chart of the input detection method in accordance with Embodiment 1.

FIG. 3 is a flow chart of the input detection method in accordance with Embodiment 1. Note that elements which are the same as the aforementioned elements are marked with the same reference number and the description thereof is omitted.

In the beginning, at step 100, power is input to the input detection device and the entire input interface of the touch sensor 10 is scanned under a non-touch state. Following, at step 110, the input detection device uses the data obtained from the scanning operation of step 100 to calibrate the touch information.

Figure 4:
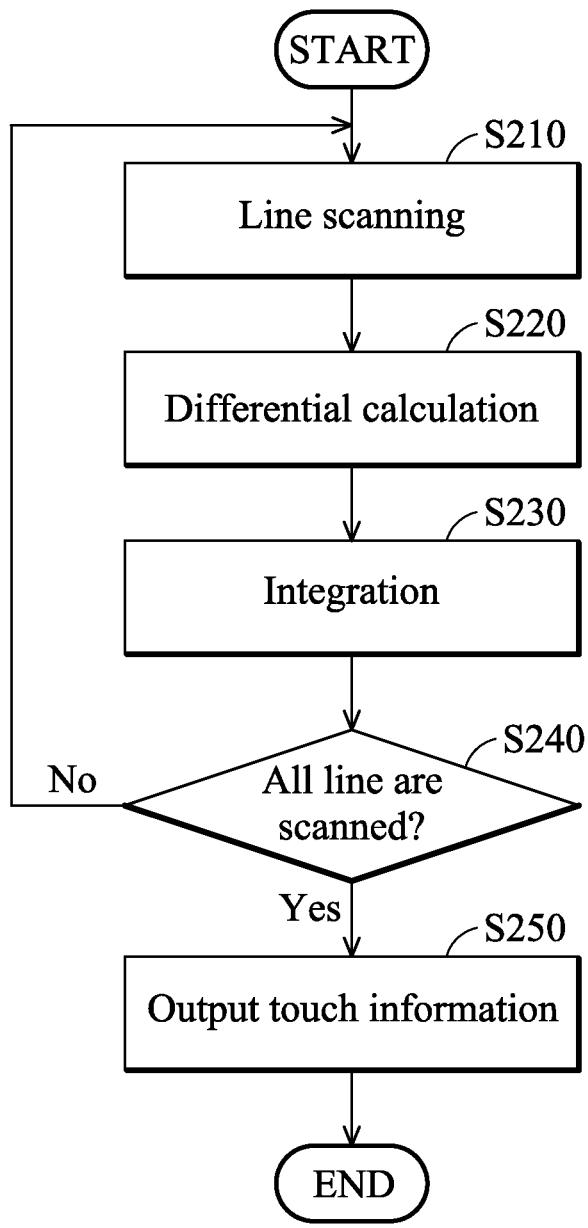
FIG. 4 is a flow chart showing an example of data input sequence of the touch sensor.

Following, at step 120, touch inputs are input to the touch sensor 10. Step 120 is further described with reference to FIG. 4. FIG. 4 is a flow chart showing an example of data input sequence of the touch sensor 10.

In FIG. 4, at step 210, a scanning operation is performed along the Y electrode 12 or the X electrode 11. For example, considering that the scanning operation is performed line by line from the bottom line to the top line, for horizontal scanning, the X electrodes 11[1]~11[M] are scanned in sequence along the i-th row Y electrode 12[$i$]. Meanwhile, for a differential calculation after step 220, the horizontal scanning is also performed along the (i−1)-th row Y electrode 12[$i-1$] which is adjacent to the i-th row Y electrode 12[$i$] on scanning sequence.

At step 220, the differential calculation is performed. Specifically, the reading part 30 uses the differential amplifier 32 to acquire the difference between the detection data obtained from the scanning of the i-th row Y electrode 12[$i$], which is the scanning target, and the detection data obtained from the scanning of the (i−1)-th row Y electrode 12[$i-1$], and output the difference as the detection data of the i-th row Y electrode 12[$ij$].

At step 230, integration is performed. Specifically, the calculation part 40 receives detection data from the reading part 30 after one scan and uses the integrator 40 and the line memory 42 to integrate the detection data. As a result, touch information of an entire input interface of the touch sensor 10 is calculated. When the integral obtained from the electrode line which is scanned first in the scanning operation is not satisfied with a predetermined value (for example 0), the integral is reset to be the predetermined value. Here, the case where the integral obtained from the electrode line which is scanned first in the scanning operation is not satisfied with a predetermined value means the case where there is one of the multi-touch inputs located at the top end of the touch sensor 10, which is equal to the scanning finish end. In this case, by resetting the integral, the input located at the top end of the touch sensor 10 does not influence the bottom end of the touch sensor 10.

At step 240, whether all lines are scanned is determined. If there are lines not scanned, the operations from steps 210~230 are repeated until all lines are scanned. If all lines are scanned, the integration result of all lines is output as touch information of an entire input interface of the touch sensor 10 at step 250.

Back to FIG. 3, at step 130, whether there is a touch input located at the two ends of the input interface of the touch sensor 10, which are equal to the scanning start end and the scanning finish end, is determined. Specifically, the determination part 50 uses the end-touch detection part 51 to determine whether the touch information of an entire input interface of the touch sensor 10 calculated at step 120 comprises a predetermined data series, and thereby detects the situation where there is a touch input located at the two ends of the input interface of the touch sensor 10.

When there is a touch input located at the two ends of the input interface of the touch sensor 10, a minimum value of the data series which constructs the touch information of an entire input interface of the touch sensor 10 is detected at step 140. Then the touch information is corrected at step 150. Specifically, the touch information is added with the minimum value detected at step 140 by the adder 53 for correction.

After the touch information is corrected, or when there is no touch input located at the two ends of the input interface of the touch sensor 10, the noise filter 60 is used to remove noise at step 160.

In this way, in the input detection device of Embodiment 1, the locations of the touch inputs due to conductors such as fingers can be detected correctly and an appropriate operation for the touch inputs, which is in response to the movement of the conductors, can be performed according to the detected locations.

Figure 5:
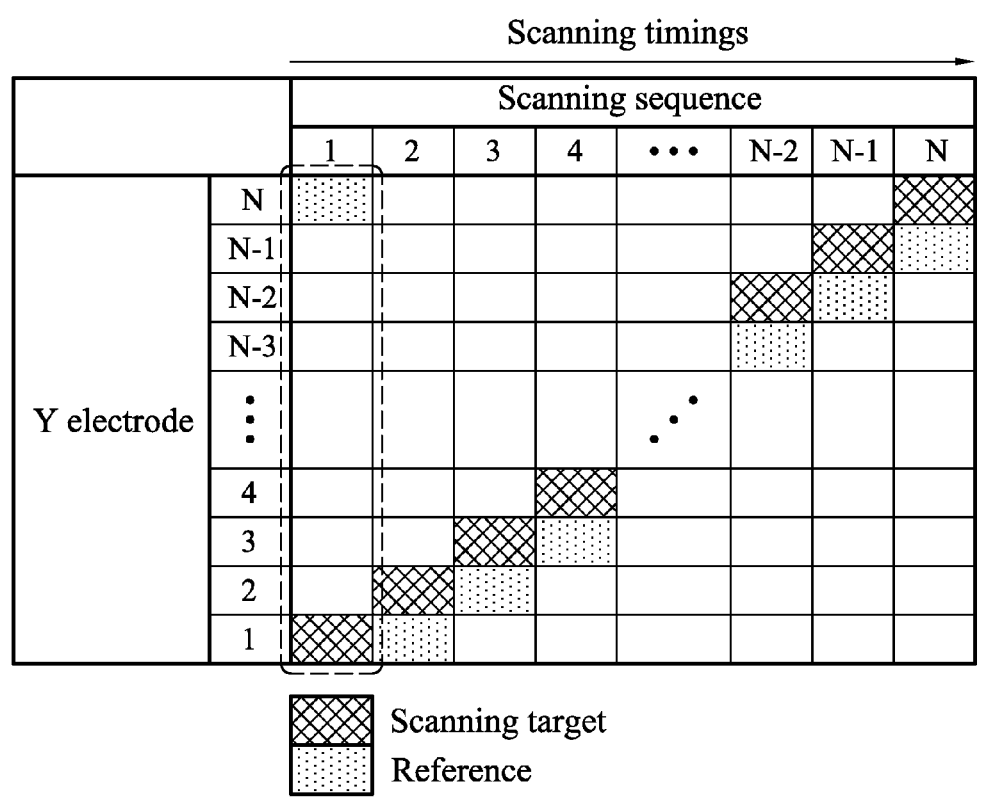
FIG. 5 is a diagram showing the differential detection algorithm of the input detection method in accordance with Embodiment 1.

FIG. 5 is a diagram showing the differential detection algorithm of the input detection method in accordance with Embodiment 1. In FIG. 5, a one-line scanning operation performed from the bottom line to the top line is taken as an example.

In FIG. 5, the horizontal axis represents the scanning timings and scanning sequence 1~N, and the vertical axis represents the row number 1~N of the Y electrodes 12. In the scanning operation in a frame, the first row Y electrode 12[1], which is the lowest row, is scanned first. Meanwhile, the last row Y electrode 12[N], which is adjacent to the first row Y electrode 12[1] on the scanning sequence, is used as a reference electrode for the differential detection. Therefore, while the X electrodes 11[1]~11[M] are scanned along the first row Y electrode 12[1], the X electrodes 11[1]~11[M] are also scanned along the N-th row Y electrode 12[N]. After the scanning for the first row Y electrode 12[1] and the N-th row Y electrode 12[N], the second row Y electrode 12[2] is scanned. Meanwhile, the first row Y electrode 12[1], which is adjacent to the second row Y electrode 12[2] on the scanning sequence, is used as a reference electrode for the differential detection. Therefore, while the X electrodes 11[1]~11[M] are scanned along the second row Y electrode 12[2], the X electrodes 11[1]~11[M] are also scanned along the first row Y electrode 12[1]. The same process is repeated until the last row Y electrode 12[N] is scanned.

In the input detection method of Embodiment 1, when the differential detection algorithm is applied to a touch sensor capable of detecting multi-touch inputs, as described in FIG. 5, theoretically an electrode adjacent to the scanning target electrode is chosen as the reference electrode. However, in the scanning operation, the electrode chosen as the reference electrode for the first scanning electrode is adjacent to the scanning target electrode on scanning sequence, but not really adjacent to the scanning target electrode physically, such that multi-touch inputs may not be corrected correctly. Specifically, if one of the multi-touch inputs is located at the top end of the touch sensor 10 and there is no input located at the bottom end of the touch sensor 10, a difference between the detection data of the first row electrode 12[1] and the N-th row electrode 12[N] is acquired when the first row electrode is scanned. Thus, wrong touch information showing that an input is located at the bottom end of the touch sensor 10 is generated. Therefore, in the case where in the scanning operation the integral of the first scanning electrode is not satisfied with a predetermined value (for example 0), the integral has to be reset to be the predetermined value (for example 0).

Figure 6A:
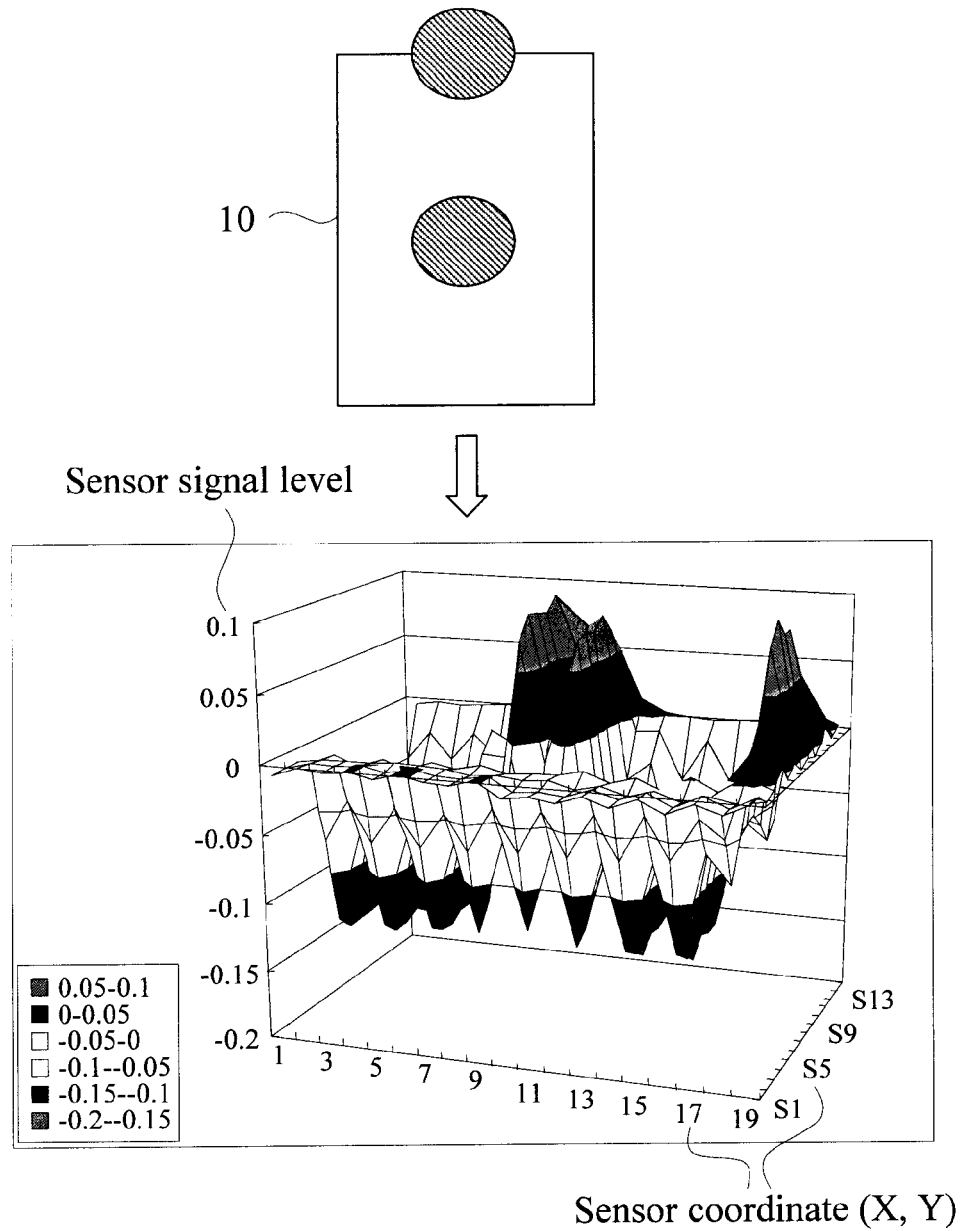
FIG. 6 shows touch information obtained from the differential detection algorithm of the input detection method in accordance with Embodiment 1.
Figure 6B:
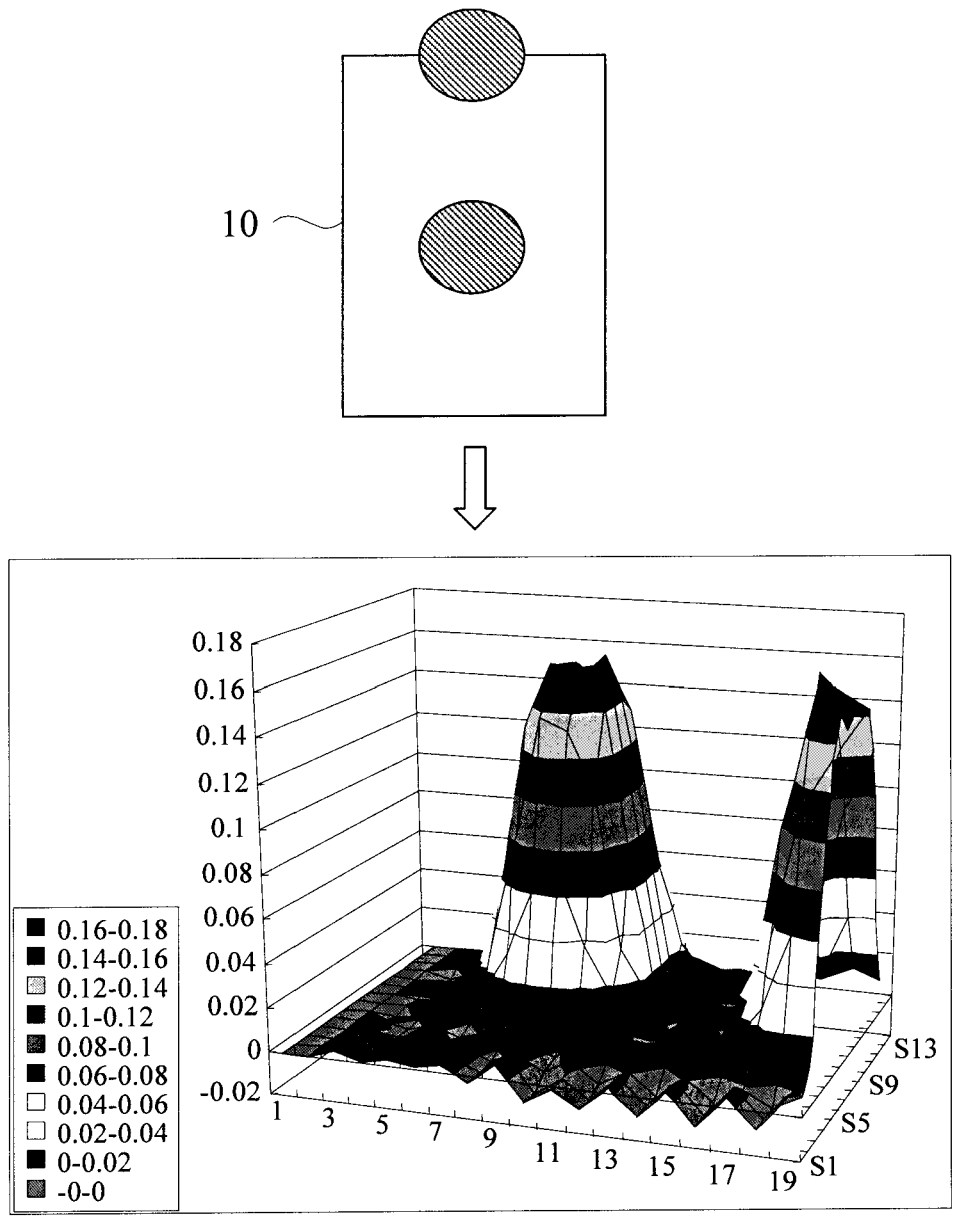

FIG. 6 shows touch information obtained from the differential detection algorithm of the input detection method in accordance with Embodiment 1. In FIG. 6, it is supposed that a horizontal scanning operation is performed from the bottom line to the top line and one of the multi-touch inputs is located at the top end of the touch sensor 10. In this condition, FIG. 6A shows touch information of an entire input interface of the touch sensor 10 without reset, and FIG. 6B shows touch information of an entire input interface of the touch sensor 10 with reset.

In the case where reset is not applied, because the N-th row Y electrode 12[N] is taken as a reference electrode when the first row Y electrode 12[1] is scanned, the touch input located at the top end of the touch sensor 10 will influence the scanning operation of the bottom end of the touch sensor 10. The detection data of the first row Y electrode 12[1] obtained from integration is shown in FIG. 6A, which comprises negative values which are not obtained in a usual input operation. Specifically, the detection data of the first row electrode 12[1] should be 0 because no touch is located on the first row electrode 12[1]. However, a difference (−a) is obtained from the detection data (a) of the N-th row Y electrode 12[N] and the detection data (0) of the first row Y electrode 12[1], so that the detection data of the first row Y electrode 12[1] is served as (−a). After that, integration is still performed for the following Y electrodes 12 and the touch information of an entire input interface of the touch sensor 10 is influenced by the error of the detection data of the first row Y electrode 12[1].

In the case where reset is applied, in the differential detection of two electrodes stretching over two ends of the input interface of the touch sensor 10, when the integral obtained from the first row Y electrode 12[1], which is located at an end of the input interface (also the scanning start end), is a negative value, the integral will be reset to be 0. In this way, even though there is an input located at the top end of the input interface of the touch sensor 10 (also the scanning finish end), correct touch information of an entire input interface of the touch sensor 10, as shown in FIG. 6B, can be obtained by using the input detection method of the invention.

As a modification, when the integral obtained from the first scanning electrode located at the scanning start end is a negative value, rather than the integral, the detection data of the reference electrode which is located at a scanning finish end will be reset.

Figure 7A:
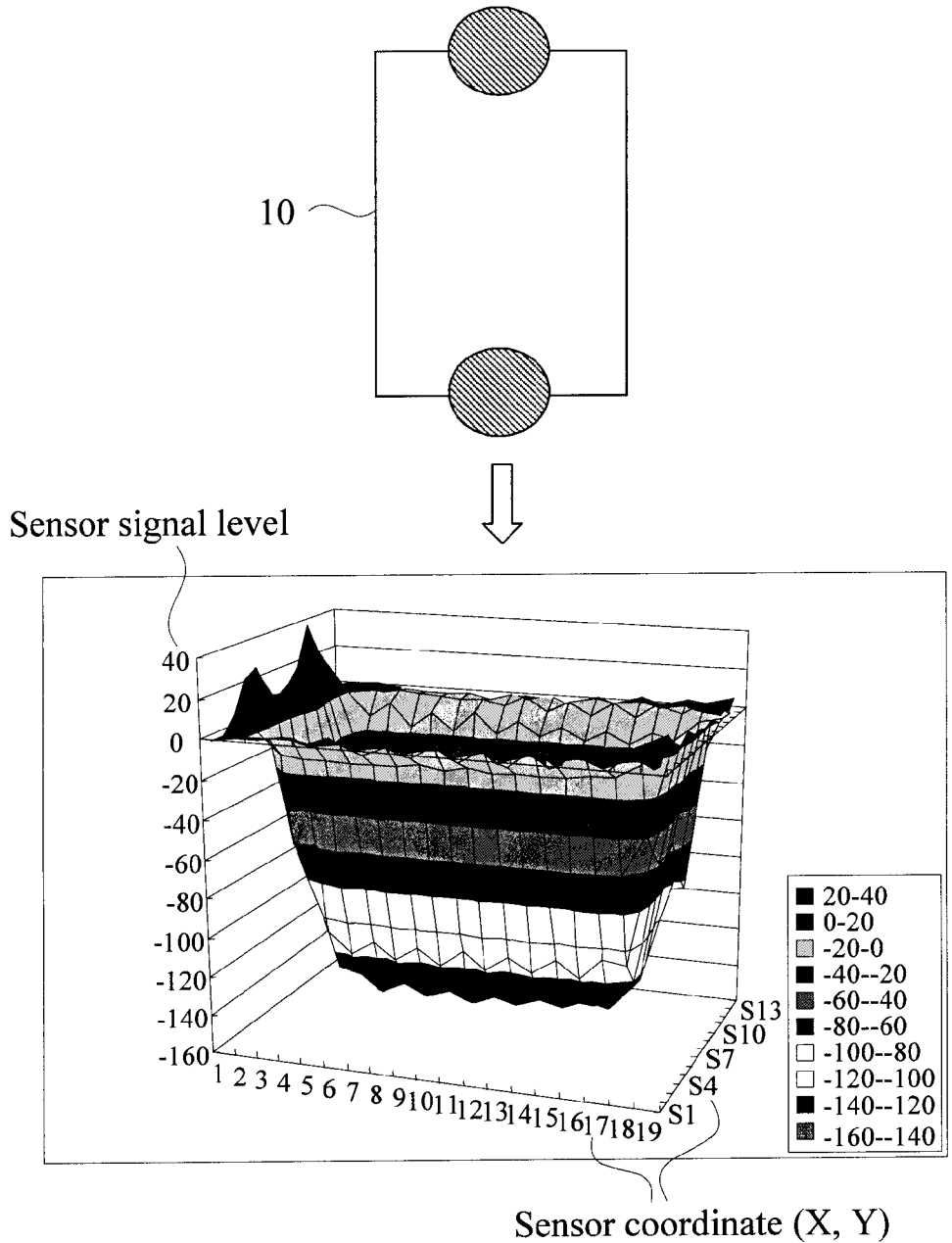
FIG. 7 shows touch information obtained from the differential detection algorithm of the input detection method in accordance with Embodiment 1.

FIG. 7 shows touch information obtained from the differential detection algorithm of the input detection method in accordance with Embodiment 1. FIG. 7A shows touch information of an entire input interface of the touch sensor 10 without correction, and FIG. 6B shows touch information of an entire input interface of the touch sensor 10 with correction.

Figure 7B:
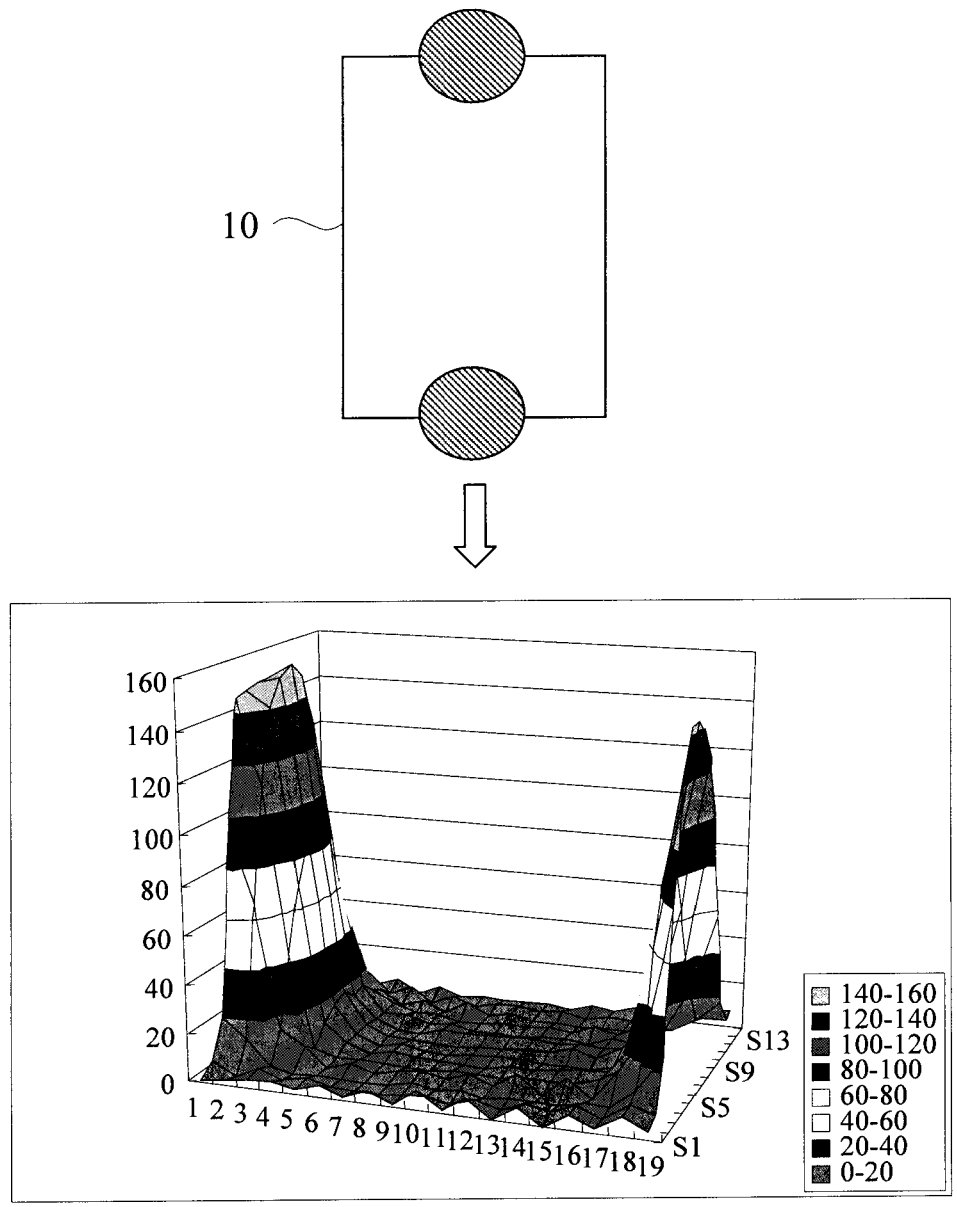

For example, when two touch inputs are located at two end of the input interface of the touch sensor, which are equal to the scanning start end and the scanning finish end, the touch information of an entire input interface of the touch sensor 10 acquired from the integration of the differential detection algorithm of the invention is a 3-dimensional data with a concave shape, as shown in FIG. 7A. When a data series comprises the 3-dimensional data, a minimum value is detected and added to each data value of the data series to correct the touch information in the input detection method of the invention. In this way, even though there are inputs located at two ends of the input interface of the touch sensor 10, which are equal to the scanning start end and the scanning finish end, correct touch information of an entire input interface of the touch sensor 10, as shown in FIG. 7B, can be obtained by using the input detection method of the invention.

Embodiment 2

Figure 8:
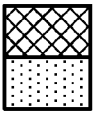
FIG. 8 is a diagram showing the differential detection algorithm of the input detection method in accordance with Embodiment 2.

FIG. 8 is a diagram showing the differential detection algorithm of the input detection method in accordance with Embodiment 2. In the input detection method of Embodiment 1, a one-line scanning operation performed from the bottom line to the top line is taken as an example. In the input detection method of Embodiment 2, a two-line scanning operation performed from the bottom line to the top line is taken as an example.

In FIG. 8, the horizontal axis represents the scanning timings and scanning sequence 1~N, and the vertical axis represents the row number 1~N of the Y electrodes 12. In the scanning operation in a frame, the first row Y electrode 12[1] and the second row Y electrode 12[2], which are the lowest rows, are scanned first. Meanwhile, the (N−1)-th row Y electrode 12[N−1] and the N-th row Y electrode 12[N], which are adjacent to the first row Y electrode 12[1] and the second row Y electrode 12[2] on the scanning sequence, are used as two reference electrodes for the differential detection. Therefore, while the X electrodes 11[1]~11[M] are scanned along the first row Y electrode 12[1] and the second row Y electrode 12[2], the X electrodes 11[1]~11[M] are also scanned along the (N−1)-th row Y electrode 12[N−1] and the N-th row Y electrode 12[N]. After the scanning for the first two rows, Y electrode 12[1] and Y electrode 12[2], the second row Y electrode 12[2] and the third row Y electrode 12[3] are scanned. Meanwhile, the N-th row Y electrode 12[N] and the first row Y electrode 12[1], which are adjacent to the second row Y electrode 12[2] and the third row Y electrode 12[3] on the scanning sequence, are used as two reference electrodes for the differential detection. Therefore, while the X electrodes 11[1]~11[M] are scanned along the second row Y electrode 12[2] and the third row Y electrode 12[3], the X electrodes 11[1]~11[M] are also scanned along the N-th row Y electrode 12[N] and the first row Y electrode 12[1]. The same process is repeated until the last row Y electrode 12[N] is scanned.

While the number of lines scanned once is increased, an operation which is the same as the differential detection algorithm of the invention described in FIG. 5 is performed. However though the number of lines scanned once is increased, because the scanning target line is shifted once by one line, integration should be performed separately for different line groups defined by dividing the lines according to the location of the lines scanned once. Specifically, in the example of FIG. 8, integration is performed for a line group comprising lines which are scanned in the odd scanning and a line group comprising lines which are scanned in the even scanning, separately.

In the scanning operation of a frame, in the beginning, the first row Y electrode 12[1] and the second row electrode 12[2] are scanned, and the (N−1)-th row Y electrode 12[N−1] and the N-th row electrode 12[N] are reference electrodes for the differential detection. In this case, suppose that the detection data obtained from the first row Y electrode 12[1], the second row electrode 12[2], the (N−1)-th row Y electrode 12[N−1], and the N-th row electrode 12[N] are represented by $R_1$, $R_2$, $R_{N-1}$, and $R_N$, respectively, the output of the differential detection $dR_1$ would be acquired from a formula, $dR_1=(R_1+R_2)-(R_{N-1}+R_N)$. The integration result $aR_1$ of the odd-scanning line group is equal to $dR_1$, because the outputs of the differential detection for the other lines of the odd-scanning line group have not been acquired yet.

In the next scanning, the scanning target lines are shifted upward by one line, so that the second row Y electrode 12[2] and the third row Y electrode 12[3] are scanned, and the N-th row Y electrode 12[N] and the first row electrode 12[1] are reference electrodes for the differential detection. In this case, suppose that the detection data obtained from the first row Y electrode 12[1], the second row electrode 12[2], the third row Y electrode 12[3], and the N-th row electrode 12[N] are represented by $R_1$, $R_2$, $R_3$, and $R_N$, respectively, the output of the differential detection $dR_2$ would be acquired from a formula, $dR_2=(R_2+R_3)-(R_N+R_1)$. The integration result $aR_2$ of the even-scanning line group is equal to $dR_2$, because the outputs of the differential detection for the other lines of the even-scanning line group have not been acquired yet.

In the next scanning, the scanning target lines are shifted upward by one line, so that the third row Y electrode 12[3] and the fourth row electrode 12[4] are scanned, and the first row Y electrode 12[1] and the second row electrode 12[2] are reference electrodes for the differential detection. In this case, suppose that the detection data obtained from the first row Y electrode 12[1], the second row electrode 12[2], the third row Y electrode 12[3], and the fourth row electrode 12[4] are represented by $R_1$, $R_2$, $R_3$, and $R_4$, respectively, the output of the differential detection $dR_3$ would be acquired from a formula, $dR_3=(R_3+R_4)-(R_1+R_2)$. The integration result $aR_3$ of the odd-scanning line group is equal to the output of the differential detection $dR_3$ plus the previous integration result $aR_1$. Namely, $aR_1+aR_3=\{(R_1+R_2)-(R_{N-1}+R_N)\}+\{(R_3+R_4)-(R_1+R_2)\}=(R_3+R_4-(R_{N-1}+R_N)$.

The same calculation is performed for the later scanning. As a result, the integration results of the odd-scanning line group and the even-scanning line group are respectively shown as follows:

The odd-scanning line group $$aR_1 = dR_1 = (R_1 + R_2) - (R_{N-1} + R_N)$$
$$aR_3 = aR_1 + dR_3 = (R_3 + R_4) - (R_{N-1} + R_N)$$
$$aR_5 = aR_3 + dR_5 = (R_5 + R_6) - (R_{N-1} + R_N)$$
$$\ldots$$
$$aR_{N-1} = aR_{N-3} + dR_{N-1} = (R_{N-1} + R_N) - (R_{N-1} + R_N)$$

The even-scanning line group $$aR_2 = dR_2 = (R_2 + R_3) - (R_N + R_1)$$
$$aR_4 = aR_2 + dR_4 = (R_4 + R_5) - (R_N + R_1)$$
$$aR_6 = aR_4 + dR_6 = (R_6 + R_7) - (R_N + R_1)$$
$$\ldots$$
$$aR_N = aR_{N-2} + dR_N = (R_N + R_1) - (R_N + R_1)$$

Here, considering that one of the multi-touch inputs is located at the top end of the touch sensor 10, suppose that the integral of the input interface of the touch sensor 10 under a non-contact state is 0, then the integral $aR_1$ obtained from the first scanning of the odd-scanning line group and the integral $aR_2$ obtained from the first scanning of the even-scanning line group would be negative values which are not obtained in a usual input operation. The values would influence the calculation for the lines scanned later. Finally, the touch information of an entire input interface of the touch sensor 10 would not be correct.

In the invention, in the case where a group consisting of scanning target lines and reference lines stretches over the scanning start end and the scanning finish end, resulting that the integral is not satisfied with a predetermined value, the integral is reset to be the predetermined value before the integration for the lines scanned later. In the above example, the integral $aR_1$ obtained from the first scanning of the odd-scanning line group and the integral $aR_2$ obtained from the first scanning of the even-scanning line group are reset to be 0. Therefore, the integration results would be as follows:

The odd-scanning line group $$aR_1 = dR_1 = 0$$
$$aR_3 = aR_1 + dR_3 = (R_3 + R_4) - (R_1 + R_2)$$
$$aR_5 = aR_3 + dR_5 = (R_5 + R_6) - (R_1 + R_2)$$
$$...$$
$$aR_{N-1} = aR_{N-3} + dR_{N-1} = (R_{N-1} + R_N) - (R_1 + R_2)$$

The even-scanning line group $$aR_2 = dR_2 = 0$$
$$aR_4 = aR_2 + dR_4 = (R_4 + R_5) - (R_2 + R_3)$$
$$aR_6 = aR_4 + dR_6 = (R_6 + R_7) - (R_2 + R_3)$$
$$...$$
$$aR_N = aR_{N-2} + dR_N = (R_N + R_1) - (R_2 + R_3)$$

As a result, touch information of an entire input interface of the touch sensor 10 is obtained by combing the integration results of the odd-scanning line group and the even-scanning line group.

Further, in the case where a three-line scanning operation is performed from the bottom line to the top line, the integration results of the (3n+1)-th-scanning line group, the (3n+2)-th-scanning line group, and the (3n+3)-th-scanning line group (n0; n is an integer) would be as follows:

The (3n+1)-th-scanning line group $$aR_1 = dR_1 = (R_1 + R_2 + R_3) - (R_{N-2} + R_{N-1} + R_N)$$
$$aR_4 = aR_1 + dR_4 = (R_4 + R_5 + R_6) - (R_{N-2} + R_{N-1} + R_N)$$
$$aR_7 = aR_4 + dR_7 = (R_7 + R_8 + R_9) - (R_{N-2} + R_{N-1} + R_N)$$
$$...$$
$$aR_{N-2} = aR_{N-5} + dR_{N-2} = (R_{N-2} + R_{N-1} + R_N) - (R_{N-2} + R_{N-1} + R_N)$$

The (3n+2)-th-scanning line group $$aR_2 = dR_2 = (R_2 + R_3 + R_4) - (R_{N-1} + R_N + R_1)$$
$$aR_5 = aR_2 + dR_5 = (R_5 + R_6 + R_7) - (R_{N-1} + R_N + R_1)$$
$$aR_8 = aR_5 + dR_8 = (R_8 + R_9 + R_{10}) - (R_{N-1} + R_N + R_1)$$
$$...$$
$$aR_{N-1} = aR_{N-4} + dR_{N-1} = (R_{N-1} + R_N + R_1) - (R_{N-1} + R_N + R_1)$$

he (3n+3)-th-scanning line group $$aR_3 = dR_3 = (R_3 + R_4 + R_5) - (R_N + R_1 + R_2)$$
$$aR_6 = aR_3 + dR_6 = (R_6 + R_7 + R_8) - (R_N + R_1 + R_2)$$
$$aR_9 = aR_6 + dR_9 = (R_9 + R_{10} + R_{11}) - (R_N + R_1 + R_2)$$
$$...$$
$$aR_N = aR_{N-3} + dR_N = (R_N + R_1 + R_2) - (R_N + R_1 + R_2)$$

In this way, irrespective of the number of lines scanned once, even though there is an input located at the scanning finish end, which is equal to an end of the input interface of the touch sensor 10, correct touch information of an entire input interface of the touch sensor 10 can be obtained by using the input detection method of the invention.

As a modification, rather than the integral, the detection data of the reference electrode which is located at a scanning finish end can be reset.

Embodiment 3

FIG. 9 is a diagram showing an example of the structure of the input detection device in accordance with the Embodiment 3. In Embodiments 1 and 2, an example is described, where stripe-shaped X electrodes 11 and Y electrodes 12 form the input detection device. In the Embodiment 3, an example is described, where other shaped X electrodes 11 and Y electrodes 12 form the input detection device.

Figure 9A:
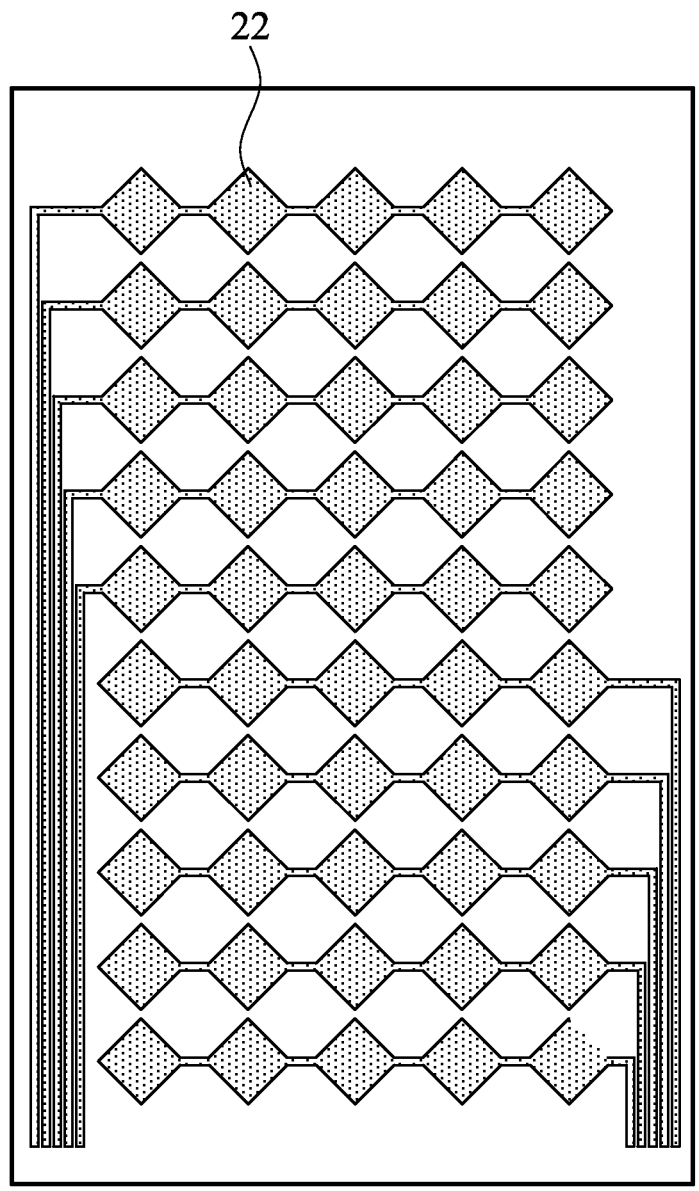
FIG. 9 is a diagram showing an example of the structure of the input detection device in accordance with the Embodiment 3.

FIG. 9A shows an example of the structure of the Y electrodes 22. As shown in FIG. 9A, in the input detection device of Embodiment 3, a Y electrode 22 is constructed by many small squares arranged along the horizontal direction, wherein a square is connected to the adjacent squares with angles thereof. In considering the arrangement of the entire structure, a plurality of the Y electrodes 22 are equal to a plurality of electrode lines arranged parallel to each other along the horizontal direction. Namely, as a whole, the pattern of the Y electrodes 22 is equal to that of the Y electrodes 12 as shown in FIG. 2.

Figure 9B:
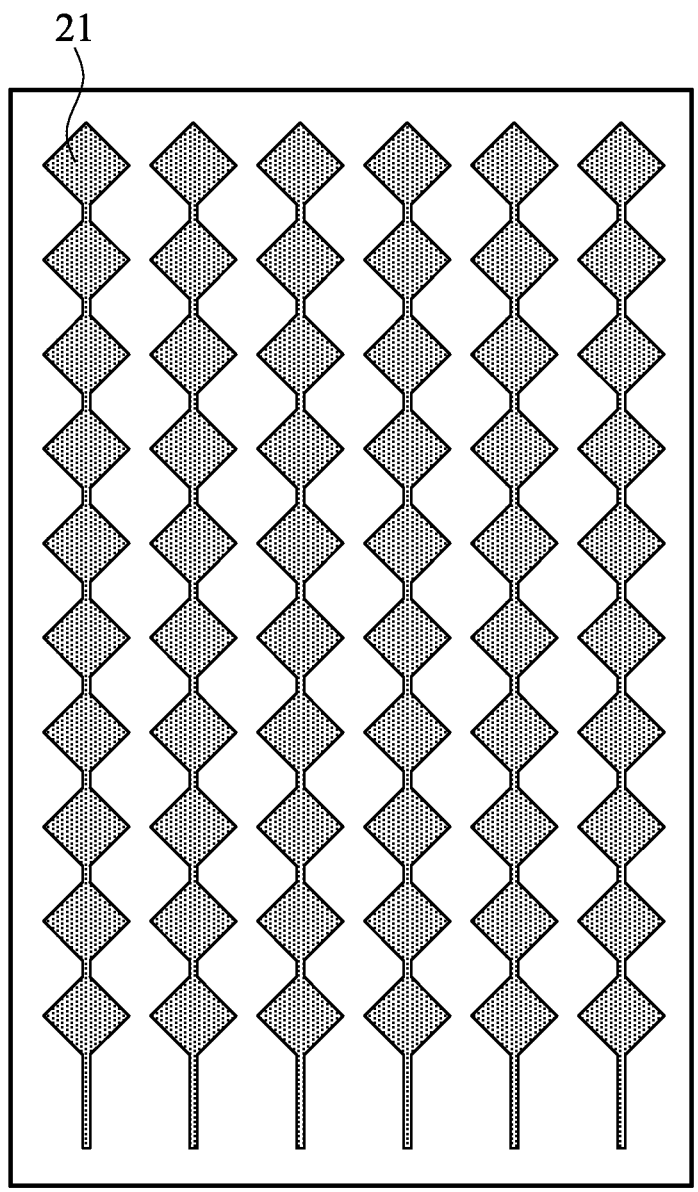

FIG. 9B shows an example of the structure of the X electrodes 21. As shown in FIG. 9B, in the input detection device of Embodiment 3, an X electrode 21 is constructed by many small squares arranged along the vertical direction, wherein a square is connected to the adjacent squares with angles thereof. In considering the arrangement of the entire structure, a plurality of X electrodes 21 are equal to a plurality of electrode lines arranged parallel to each other along the vertical direction. Namely, as a whole, the pattern of the X electrodes 21 is equal to that of the X electrodes 11 shown in FIG. 2.

Figure 10A:
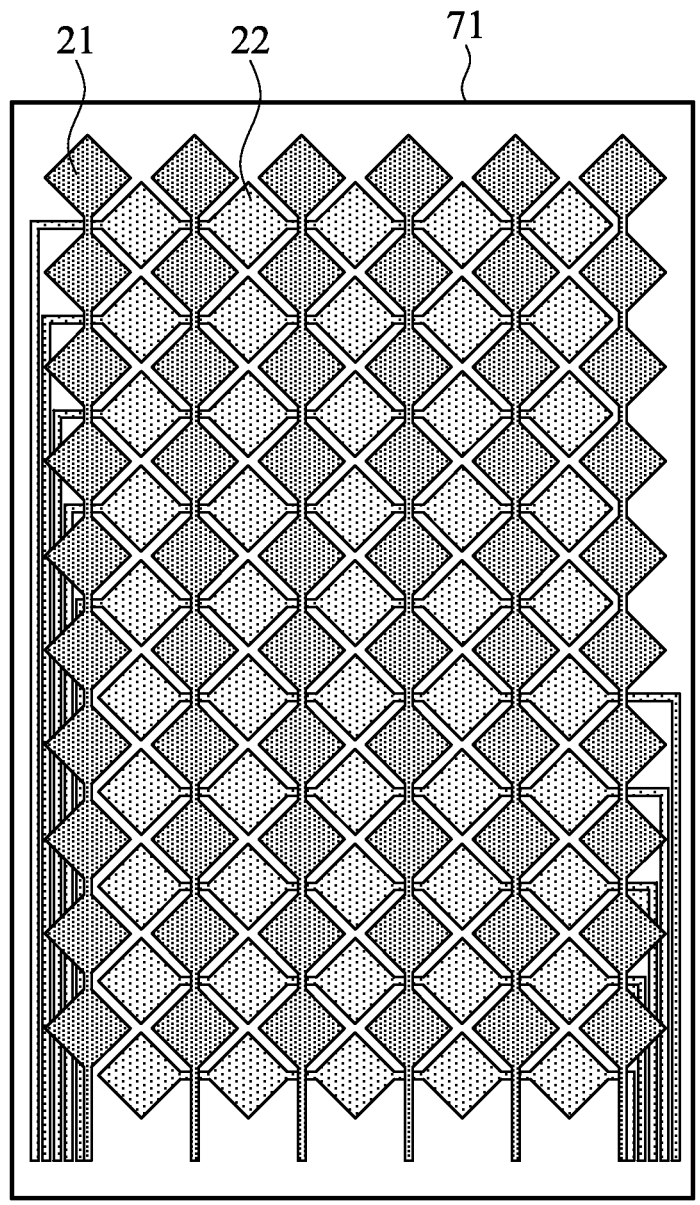
FIG. 10 is a diagram showing that the X electrodes and the Y electrodes shown in FIG. 9 are overlapped.
Figure 10B:
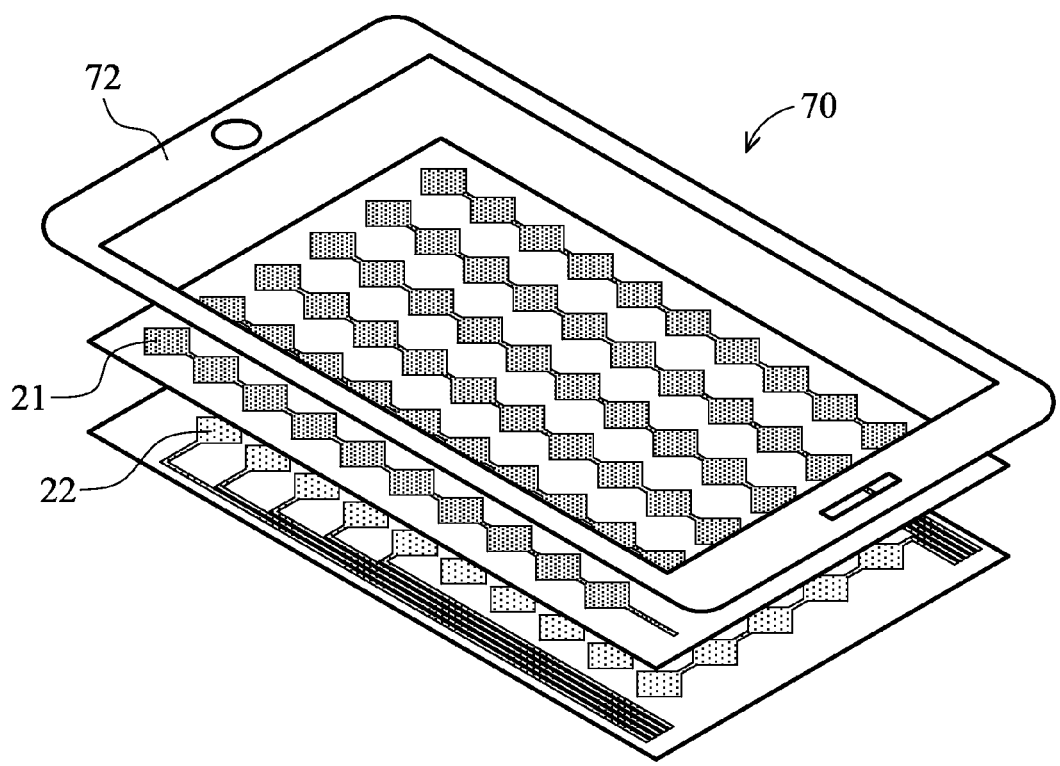

FIG. 10 is a diagram showing that the X electrodes 21 and the Y electrodes 22 are overlapped. FIG. 10A is a plan view showing a touch sensor electrode part 71 provided with the X electrodes 21 and the Y electrodes 22 which are overlapped. FIG. 10B is a stereogram showing the entire structure of the touch sensor 70 including a glass cover 72.

In FIG. 10A, the arrangement for the X electrodes 21 and the Y electrodes 22 make the small squares not overlap with each other. The X electrodes 21 and the Y electrodes 22 are arranged in a matrix, forming the touch sensor electrode part 71.

In FIG. 10B, an example is described, where a glass cover 72 is disposed above the X electrode 21 and the Y electrode 22. In this way, the touch sensor 70 can be formed by covering the touch sensor electrode part 71 by the glass cover 72.

For example, an input detection device of the invention can be constructed by the above mentioned touch sensor electrode part 71 and the touch information detection part 20 shown in FIG. 1. The input detection methods shown in Embodiments 1 and 2 can be applied to detect multi-touch inputs appropriately.

As described above, the inner electrode structure and the external structure for the touch sensors 10 and 70 can be made to various shapes according to the purpose. A touch panel capable of detecting multi-touch inputs can be constructed by many kinds of touch sensors 10 and 70.

Embodiment 4

Figure 11:
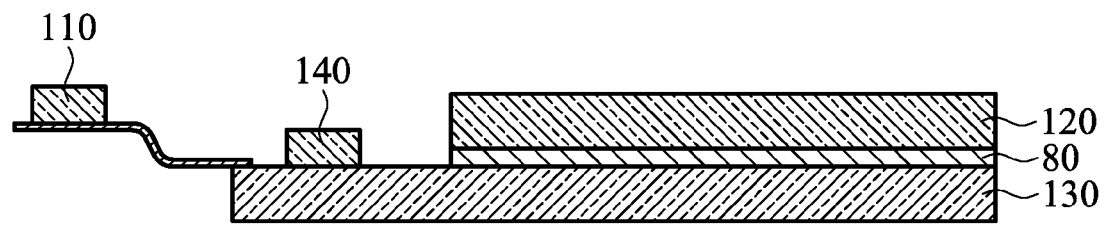
FIG. 11 is a diagram showing an example of the input detection device in accordance with the Embodiment 4.

FIG. 11 is a diagram showing an example of the input detection device in accordance with the Embodiment 4. The input detection device of the Embodiment 4 is an in-cell type touch panel. The input detection device of the Embodiment 4 comprises a touch sensor 80, a color filter glass 120, an array glass 130, a touch sensor controller 110, and a display driving circuit 140.

The input detection device of the Embodiment 4 has a structure wherein a touch sensor module is installed in a display module. In FIG. 11, the touch sensor 80 and touch sensor controller 110 form the touch sensor module, and the color filter glass 120, the array glass 130, and the display driving circuit 140 form the display module.

The color filter glass 120 and the array glass 130 sandwich the touch sensor 80. Namely, the touch sensor module is installed in the display module.

The input detection device of Embodiment 4 can be constructed by the un-cell type touch panel, wherein the touch sensor 80 can adopt touch sensors with many kinds of electrode structures, comprising the touch sensor 10 described in the Embodiment 1, and the touch sensor 70 described in the Embodiment 3. The touch sensor is formed by a transparent electrode layer such as Indium Tin Oxide (ITO), wherein the transparent electrode layer is formed under the color filter substrate 120. Without a special glass substrate for the touch sensor 80, the in-cell type touch panel can be made thin, with high aperture, by a low cost.

The array glass 130 is formed with TFTs which are driven by the display driving circuit to display images.

The touch sensor controller 110 is a means for driving and controlling the touch sensor 80. The touch sensor controller 110 is embedded with the touch information detection part 20 described in FIG. 1.

According to the input detection device of Embodiment 4, the input detection device can be made thinner, multi-touch inputs can be detected accurately, and a multi-touch panel with less wrong responses can be obtained.

Embodiment 5

Figure 12:
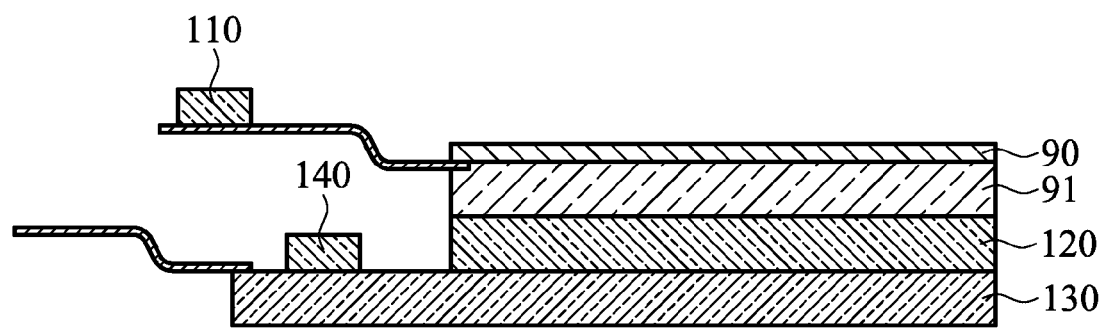
FIG. 12 is a diagram showing an example of the input detection device in accordance with the Embodiment 5.

FIG. 12 is a diagram showing an example of the input detection device in accordance with the Embodiment 5. The input detection device of the Embodiment 5 is a touch panel wherein the touch sensor module and the display module are disposed independently.

The input detection device of the Embodiment 5 comprises a touch sensor 90, a sensor glass 91, a touch sensor controller 110, a color filter glass 120, an array glass 130, and a display driving circuit 140. The touch sensor 90, the sensor glass 91, and touch sensor controller 110 form the touch sensor module, and the color filter glass 120, the array glass 130, and the display driving circuit 140 form the display module.

The touch sensor 90 can adopt touch sensors with many kinds of electrode structures, comprising the touch sensor 10 described in Embodiment 1, and the touch sensor 70 described in Embodiment 3. The touch sensor 90 is formed by a transparent electrode layer such as an ITO. The input detection device of the Embodiment 5 is different from the in-cell type touch panel described in Embodiment 4. A discrete touch sensor module is formed on the display module independently.

According to the input detection device of the Embodiment 5, the thickness of the input detection device is thicker, but multi-touch inputs can be detected more accurately without the influence of noises from the display module.

As a modification of the Embodiment 5, an on-cell type structure can also be utilized, wherein for the structure shown in FIG. 12, the sensor glass 91 is removed and the touch sensor 90 is disposed directly on the color filter glass 120. In the on-cell type touch panel, the touch sensor controller 110 provided with the touch information detection part 20 described in FIG. 1 can still be utilized to detect multi-touch inputs accurately.

Embodiment 6

Figure 13:
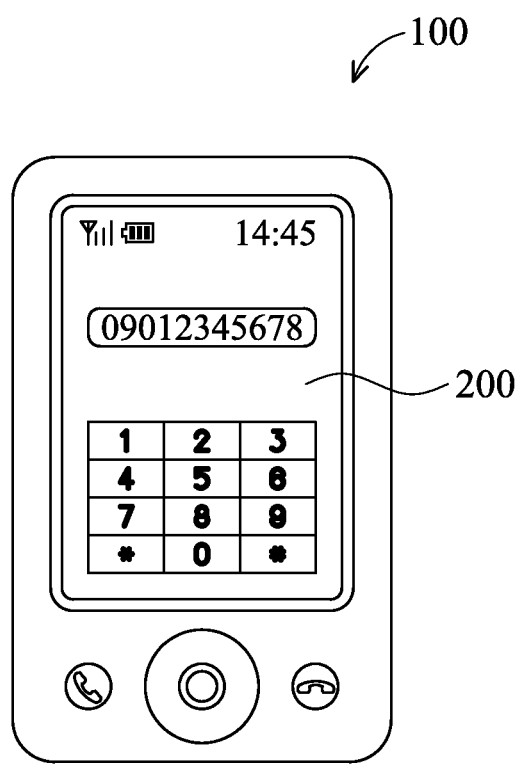
FIG. 13 is a diagram showing an example of an electronic device in accordance with Embodiment 6.

FIG. 13 is a diagram showing an example of an electronic device in accordance with Embodiment 6. The electronic device 130 in FIG. 13 is represented by a cell phone, but other electronic devices such as a television, a watch, a PDA, a tablet computer, a laptop computer, a desktop computer, a car navigation device, and a portable game device, or etc. are also suitable for the invention.

The cell phone 100 is provided with a display device 200 embedded with an input detection device of one of Embodiments 1-5. The display device 200 can show an input image corresponding to the input interface of the touch sensor. In addition to showing time or the state information of the cell phone 100 such as signal intensity and the amount of battery power remaining, the display device 200 also shows the number key which is allowed for users to touch the input interface to operate the cell phone 100.

The display device 200 can be many kinds of displays comprising liquid crystal displays, OLED displays, 3D displays, or etc.

In recent years, portable electronic devices such as cell phones have made progress in miniaturization, but a large display screen is preferred. Thus, it has become difficult to dispose a margin area surrounding the input interface of the touch sensor. When the margin area hidden in the frame of the electronic device is insufficient to be disposed with a reference electrode for differential detection in the product stage, the input detection method and the input detection device of the invention is particularly useful.

In the Embodiments 1-6, the invention is an input detection method or an input detection device, which is applied to a display device having a touch sensor module. However, the invention can be an input detection program executed by a computer to perform the functions of the input detection method or the input detection device, or a computer readable media storing the above program.

So far, a projected mutual capacitive touch panel with electrodes arranged in a matrix has been described, but an independent bottom type of a projected self capacitive touch panel with electrodes arranged in a matrix is also preferred as long as the bottom size is very small and delicate.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An input detection device for detecting a touch input from an input interface of a touch sensor provided with electrodes arranged in a matrix, comprising:
    a reading part reading the touch input from the input interface by scanning the electrodes from an end of the input interface to an opposite end of the input interface, wherein in every horizontal scanning even electrode lines which are successive on a scanning sequence are scanned, and by acquiring a difference between detection data obtained from a half of the even electrode lines which are successive on the scanning sequence and detection data obtained from another half of the even electrode lines which are successive on the scanning sequence, wherein the difference is also acquired in the case where at least one of the even electrode lines is an electrode line located at the end of the input interface and at least one of the even electrode lines is an electrode line located at the opposite end of the input interface; and
    a calculation part integrating the difference acquired in every horizontal scanning to obtain integration results representing touch information,
    wherein the calculation part comprises a reset part wherein if the integration result obtained by the calculation part in the case where at least one of the even lines is an electrode line located at the end of the input interface and at least one of the even electrode lines is an electrode line located at the opposite end of the input interface is not satisfied with 0, the reset part resets the integration result or the detection data obtained from the electrode line which is located at the opposite end of the input interface to be 0.

2. The input detection device as claimed in claim 1, further comprising:
    an end-touch detection part determining whether the touch information comprises a predetermined data series to detect that there are touch inputs located at the two ends of the input interface of the touch sensor; and
    a correction part adding a minimum value of the data series to every data value of the data series to correct the touch information if the end-touch detection part detects that there are touch inputs located at the two ends of the input interface of the touch sensor.

3. The input detection device as claimed in claim 1, wherein when the number of a half of the even electrode lines which are successive is two or more, the calculation part performs integration for each of line groups, respectively, wherein the line groups are defined by dividing the electrode lines according to the location of the every even electrode lines, and combines the integration result of each line group to obtain the touch information after the entire input interface of the touch sensor is scanned.

4. The input detection device as claimed in claim 1, wherein the reading part comprises:
    a selector selecting the even electrode lines which are successive on the scanning sequence; and
    a differential amplifier outputting the difference between the detection data obtained from a half of the even electrode lines which are successive and the detection data obtained from the other half of the even electrode lines which are successive.

5. The input detection device as claimed in claim 1, wherein the calculation part comprises:
    a integrator integrating the difference for the entire input interface of the touch sensor;
    a first memory storing the integration result which is obtained by the integrator from one scan; and
    a second memory storing the integration result of the entire input interface of the touch sensor obtained by the integrator as the touch information.

6. The input detection device as claimed in claim 1, further comprising:
    a noise filter removing low level noise which is lower than a threshold value from the touch information.

7. The input detection device as claimed in claim 1, wherein the input detection device is installed in a display device and the display device displays an input image corresponding to the input interface of the touch sensor.

8. An input detection method for detecting a touch input from an input interface of a touch sensor provided with electrodes arranged in a matrix, comprising:
    a reading step for reading the touch input from the input interface by scanning the electrodes from an end of the input interface to an opposite end of the input interface, wherein in every horizontal scanning even electrode lines which are successive on a scanning sequence are scanned, and by acquiring a difference between detection data obtained from a half of the even electrode lines which are successive on the scanning sequence and detection data obtained from another half of the even electrode lines which are successive on the scanning sequence, wherein the difference is also acquired in the case where at least one of the even electrode lines is an electrode line located at the end of the input interface and at least one of the even electrode lines is an electrode line located at the opposite end of the input interface; and
    a calculation step for integrating the difference acquired in every horizontal scanning to obtain integration results representing touch information,
    wherein the calculation step comprises a reset step wherein if the integration result obtained by the calculation part in the case where at least one of the even lines is an electrode line located at the end of the input interface and at least one of the even electrode lines is an electrode line located at the opposite end of the input interface is not satisfied with 0, the integration result or the detection data obtained from the electrode line which is located at the opposite end of the input interface is reset to be 0.

9. The input detection method as claimed in claim 8, further comprising:
    an end-touch detection step for determining whether the touch information comprises a predetermined data series to detect that there are touch inputs located at the two ends of the input interface of the touch sensor; and
    a correction step for adding a minimum value of the data series to every data value of the data series to correct the touch information if the end-touch detection part detects that there are touch inputs located at the two ends of the input interface of the touch sensor.

10. The input detection method as claimed in claim 8, wherein when the number of a half of the even electrode lines which are successive is two or more, the calculation step comprises performing integration for each of line groups, respectively, wherein the line groups are defined by dividing the electrode lines according to the location of the every even electrode lines, and combining the integration result of each line group to obtain the touch information after the entire input interface of the touch sensor is scanned.

11. The input detection method as claimed in claim 8, wherein the reading step comprises:
- a selecting step for selecting the even electrode lines which are successive on the scanning sequence; and
- an output step for outputting the difference between the detection data obtained from a half of the even electrode lines which are successive and the detection data obtained from the other half of the even electrode lines which are successive.

12. The input detection method as claimed in claim 8, further comprising:
- a noise filtering step for removing low level noise which is lower than a threshold value from the touch information.

\* \* \* \* \*